Figure 1:
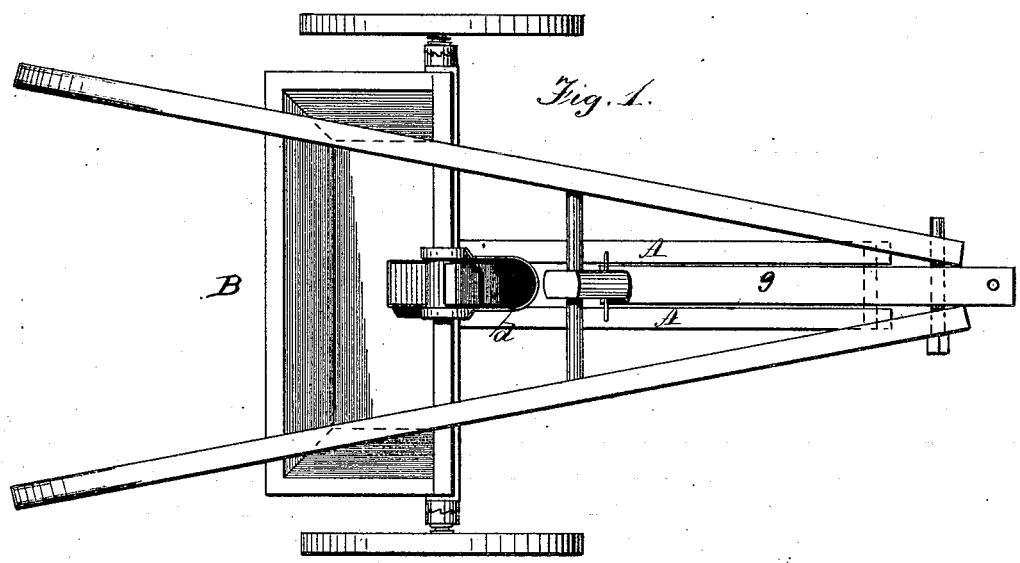

R. B. BOATWRIGHT.
CORN-PLANTER.

No. 185,162. Patented Dec. 12, 1876.

2 Sheets—Sheet 1.

Witnesses:
Grenville Lewis
M. C. Church

Inventor:
Reuben B. Boatwright
By Hill, Ellsworth & Spear
His Atty.

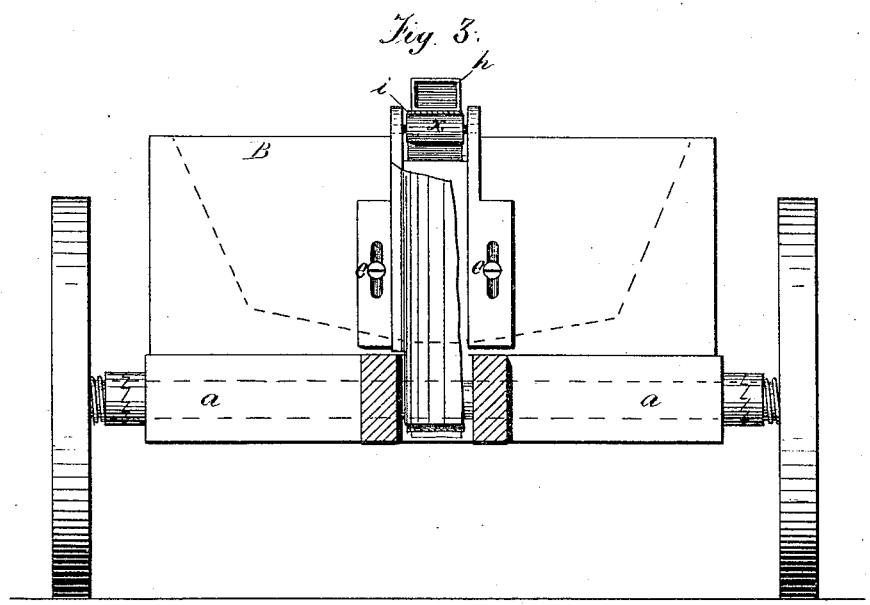

UNITED STATES PATENT OFFICE.

REUBEN B. BOATWRIGHT, OF MARION, VIRGINIA, ASSIGNOR OF ONE-HALF OF HIS RIGHT TO GEORGE W. HENDERLITE, OF SAME PLACE.

IMPROVEMENT IN CORN-PLANTERS.

Specification forming part of Letters Patent No. 185,162, dated December 12, 1876; application filed April 8, 1876.

*To all whom it may concern:*

Be it known that I, REUBEN B. BOATWRIGHT, of Marion, in the county of Smyth and State of Virginia, have invented certain new and useful Improvements in Corn-Planters, of which the following is a full, clear, and exact description, reference being had to the accompanying drawings.

My invention relates to a two-wheeled machine, so constructed as to contain a regular bull-tongue plow, with beam, handle, and other necessary appurtenances. The wheels are coupled together by a round axle three feet in length and one and a half inch in diameter. This axle is squared at the ends, and passes through a mortise in the center of the wheels, and fastened thereto, so as to revolve with the wheels. The axle passes at right angles through two pieces of timber, made, preferably, three inches broad and two and a half inches thick, and about four feet long. They are separated on the axle, near the center, just far enough for the beam containing the bull-tongue to work up and down smoothly. They run back about twelve or fourteen inches in rear of the axle, and serve as support for the coverers, and also for the hopper to rest upon. The front ends run along either side the beam, and are fastened to it by an iron pin passing through them all, and screwing them loosely together. That part of the axle between these two pieces of timber is uncovered. The other parts pass through boxes that may run the whole length, and are bored out just large enough for the axle to revolve freely. The holes in the boxes and cross-timbers, through which the axle passes, come together, and they are fastened securely in front and rear of the axle, so as to keep the machine perfectly squared and true. The hopper is large enough to contain about half a bushel of corn, and so arranged as to incline the corn to the center. Through the bottom there passes a hole about three-fourths of an inch square. This hopper rests on the cross-pieces and the casings of the axle as a fixture. Near the top of the front part of the hopper is a roller three-fourths of an inch wide and about one-half an inch in diameter to assist in carrying the band. This roller is supported on a separate standard from the hopper, to which it is screwed adjustably, so as to slide up or down for tightening or loosening the band. To this a tin spout is fastened, which conducts the corn down just in rear of the bull-tongue. The band passes around the axle, through the hopper, and over the roller at the top of the hopper, and down through the spout. It is preferably three-fourths of an inch in width and about nine inches long, to which tin cups about three-fourths of an inch by one-half an inch are attached to carry the corn. They fill as they pass up through the corn. The corn is prevented from escaping from the hopper at the bottom by means of small blocks of wood attached by small wire rivets to the band between the cups. Just in front of each cup a space, say an inch, is left for the cups to fill and empty. The blocks or cups are made to fit exactly the hole in the bottom of the hopper. The wheels are about fourteen or fifteen inches in diameter, and may be two or two and a half inches thick, made of plank riveted together crosswise, and banded with hoop-iron. The coverers are two small iron teeth, a little oval on the inner sides, fastened in the cross-pieces projecting in rear of the axle, just far enough apart to cut the inner edge of the furrow open by the bull-tongue. These teeth can be shortened or lengthened for depth.

Figure 2:
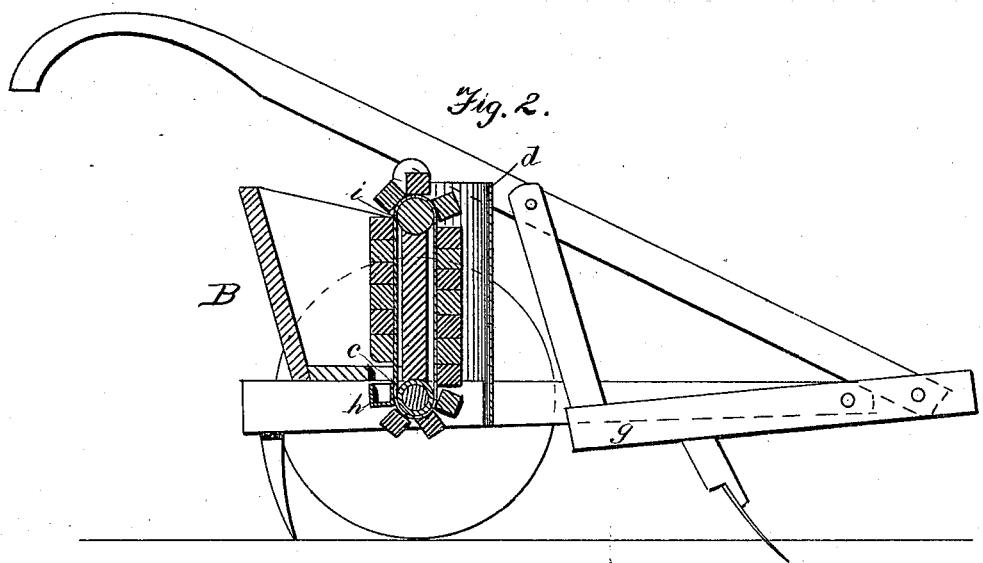

In the drawings, Figure 1 represents a plan view of my improved planter; Fig. 2, a longitudinal vertical section through the box and band. Fig. 3 is a transverse vertical section in front of the band, showing more particularly the standard which supports the upper roller and the band.

A A are the longitudinal sills, which support the coverers, and through which the axle passes. Upon them and the boxes $a\ a$ rests the hopper B. The axle is shown in section in Fig. 2, with the band carrying the blocks and boxes, which band is supported above by the roller $x$. The hole in the bottom of the hopper is shown at $c$ in the same figure, and the spout is represented at $d$. The beam carrying the bull-tongue is indicated in Figs. 1 and 2 by the letter $g$, and the figures also show plainly the ordinary supports and connections.

Fig. 3 shows more clearly the standard with the roller in the slotted upper portion thereof, the band *i* passing over the roller and axle, and the set-screws *e e* in the slots on the sides, by which the standard may be raised or lowered. It also illustrates the boxes *h h*.

The wheels may have the ordinary clutches, for preventing reverse movement of the band in backing or turning.

The advantages of my invention are its simplicity. All its operations can be easily understood by any ordinary farmer. The materials are all on the farm, and it can be repaired, or even made by the farmer himself or a neighborhood mechanic.

As there is a great diversity of opinion as to the distance at which corn should be planted, this machine, with a little arrangement of the cups on the band, can be made to drop it at regular intervals, and at any distance at which corn is planted. The length of the band, the size of the wheel, the circumference of the axle given, we know exactly where to place our cups. For example, if the wheels are forty-five inches in circumference, the axle four and a half inches in circumference, and the band nine inches long, the wheel will make two revolutions while the band passes around the axle once. Two cups equidistant on the band would drop the corn forty-five inches apart; four cups would drop it twenty-two and a half inches, &c. Knowing, therefore, these distances we have only to increase or diminish the number of cups, and lengthen or shorten the band, to drop it the distance we want.

Having thus fully described my invention, what I claim, and desire to secure by Letters Patent, is—

1. The sills A A, extending rearward under the hopper, forming guides for the band with the cups and boxes and supports for the hopper, in combination with the boxes *a a*, which cover the axle and abut against the sills, and also form support for the hopper, the whole being constructed and arranged as set forth.

2. The band *i*, carrying blocks and boxes, supported on roller above, and operating in connection with the hopper, as set forth.

3. The improved planter, consisting of the box B, resting upon the beams A A, and boxes *a a*, the band *i*, carrying the blocks and cups, and passing over the axle below and the roller above, and the spout *d*, attached to the seed-box, and arranged between the beams A A, as and for the purposes set forth.

R. B. BOATWRIGHT.

Witnesses:
W. P. FRANCIS,
JNO. A. BLOUNT.